US009476537B2

(12) United States Patent
Bichler

(10) Patent No.: US 9,476,537 B2
(45) Date of Patent: Oct. 25, 2016

(54) APPARATUS FOR THE REHABILITATION OF PIPELINES

(75) Inventor: Andreas Bichler, Ebbs/Tirol (AT)

(73) Assignee: TRELLEBORG PIPE SEALS DUISBURGH GMBH (DE)

( * ) Notice: Subject to any disclaimer, the term of this patent is extended or adjusted under 35 U.S.C. 154(b) by 0 days.

(21) Appl. No.: 14/126,965

(22) PCT Filed: May 18, 2012

(86) PCT No.: PCT/EP2012/059291
§ 371 (c)(1),
(2), (4) Date: Jan. 23, 2014

(87) PCT Pub. No.: WO2013/000623
PCT Pub. Date: Jan. 3, 2013

(65) Prior Publication Data
US 2014/0137972 A1    May 22, 2014

Related U.S. Application Data

(60) Provisional application No. 61/501,355, filed on Jun. 27, 2011.

(30) Foreign Application Priority Data
Jun. 27, 2011    (DE) .......... 10 2011 078 106

(51) Int. Cl.
*F16L 55/18* (2006.01)
*F16L 27/08* (2006.01)
*F16L 55/40* (2006.01)

(52) U.S. Cl.
CPC ............ *F16L 55/18* (2013.01); *F16L 27/0828* (2013.01); *F16L 55/40* (2013.01)

(58) Field of Classification Search
CPC ..... F16L 27/0828; F16L 55/18; F16L 55/40; F16L 55/179; F16L 55/265; F16L 55/163; E03F 3/06; E03F 2003/065
USPC .......... 405/150.1, 184, 184.1, 184.2; 138/97, 138/98
See application file for complete search history.

(56) References Cited

U.S. PATENT DOCUMENTS

| 6,089,265 A | 7/2000 | Wang |
| 6,164,707 A * | 12/2000 | Ungchusri .......... F16L 27/0824 285/276 |
| 2005/0092382 A1 | 5/2005 | Muhlin |

FOREIGN PATENT DOCUMENTS

| DE | 296 00 479 U1 | 6/1997 |
| DE | 299 05 480 U1 | 7/1999 |
| DE | 299 06 383 U1 | 7/1999 |
| EP | 1 519 100 A1 | 3/2005 |
| GB | 1 224 309 A | 3/1971 |
| WO | WO 02101247 A1 | 12/2002 |

OTHER PUBLICATIONS

International Search Report & Written Opinion, Mar. 1, 2013, for PCT/EP2012/059291.

* cited by examiner

*Primary Examiner* — Benjamin Fiorello
*Assistant Examiner* — Carib Oquendo
(74) *Attorney, Agent, or Firm* — Dickinson Wright PLLC

(57) ABSTRACT

The invention relates to an apparatus (10) for the rehabilitation of pipelines using a fluid line system (28) with at least one fluid line (54, 56) for supplying and/or removing a fluid medium, wherein the fluid line system (28) is provided with at least one pivot joint (30).

13 Claims, 2 Drawing Sheets

APPARATUS FOR THE REHABILITATION OF PIPELINES

CROSS-REFERENCE TO RELATED APPLICATIONS

The present application is a 35 U.S.C. Section 371 national stage filing of International Patent Application No. PCT/EP2012/059291, filed 18 May 2012, and through which priority is claimed to German application DE 10 2011 078 106.4, filed 27 Jun. 2011, and U.S. Provisional application 61/501,355, filed 27 Jun. 2011, the disclosures of which are incorporated herein by reference in their entireties.

The present invention relates to an apparatus for the rehabilitation of pipelines using a fluid line system with at least one fluid line for supplying and/or removing a fluid medium.

These types of apparatuses for the rehabilitation of pipelines are used in the area of sewerage systems, but also in the area of buildings. In this connection in particular, main pipelines, lateral pipelines and, in particular, house connection pipes and the connecting regions thereof are to be rehabilitated. Leakages and/or cracks which have to be rehabilitated frequently appear at said aforementioned connecting regions. It is possible to repair leaking sections of the pipelines and in particular of the connecting regions by inserting a lining element.

In the case of a rehabilitation method made known from EP 1 519 100 B1, prior to the insertion of the rehabilitation apparatus into the line to be rehabilitated, such a lining element is provided with an adhesive, in particular with a hardenable resin, for permanent connection to the inner surface of the pipe wall. The lining element preferably comprises a layer of resin-absorbent material, in particular a textile flat-shaped article, for example a non woven fabric or fiber material. The lining element can also be referred to as a liner. In order to move the lining element to the position to be rehabilitated, the aforementioned apparatus for the rehabilitation of pipelines and, in this connection, frequently a calibration hose, are used. The calibration hose can have, in particular, a main pipe calibration hose and a lateral pipe calibration hose, the main pipe calibration hose serving for the purpose of pressing a main pipe section of the lining element against the inside wall of the main pipe and the lateral pipe calibration hose serving for the purpose of inverting a lateral pipe section of the lining element into a lateral pipe (e.g. house connection pipe) to be rehabilitated. This operation is also referred to as inverting or putting in an inverted position and can be effected by means of applying a fluid pressure onto the calibration hose or, as an alternative to this, by means of a cable or pipe eel which is attached to the free end of the lateral pipe calibration hose.

In each case, the end of the main pipe calibration hose can be fastened by means of tensioning sleeves to the rehabilitation apparatus, which is frequently also referred to as a packer, such that an air-tight connection is created. By supplying a fluid medium, pressure can be provided, by means of which the lateral pipe calibration hose, together with the lining element, can be inverted into the lateral pipe. Said fluid pressure can be provided by a fluid medium by means of a fluid line system.

To invert the lateral pipe calibration hose into the lateral pipe, first of all a section of the calibration hose in the region of the mouth of the lateral pipe can be pressed into the main pipe against the inside wall of the pipe. This is effected by means of an aligning body and an associated lifting mechanism which are arranged on the rehabilitation apparatus. By means of a spring means, the aligning body can be pressed in a resiliently springable manner in the direction of the mouth of the lateral pipe such that a displacement of the aligning body is made possible until said aligning body latches in the mouth of the lateral pipe. If the aligning body is not situated precisely with respect to the mouth of the lateral pipe and abuts against an edge of the main pipe, the aligning body is able to be aligned precisely with respect to the mouth of the lateral pipe by means of displacement and/or rotation of the packer.

The fluid pressure subsequently applied to the calibration hose enables the inverting of the lateral pipe calibration hose together with the liner into the lateral pipe. After the inverting, the line is situated in the desired position. The fluid introduced by means of the fluid line system makes sure that the liner is pressed against the inside wall of the pipe and the resin can harden. Once the liner has hardened, the fluid pressure can be removed and the rehabilitation apparatus moved out of the pipeline. The hardened liner abuts against the inside wall of the pipeline in a positive-locking and force-locking manner.

The apparatus for the rehabilitation of pipelines disclosed in EP 1 519 100 B1 has a pressure line, by means of which compressed air is introduced into the calibration hose such that the lateral pipe calibration hose is inverted into the lateral pipe with the liner. A disadvantage in this case is that as a result of the rotation of the apparatus about its longitudinal axis for aligning the aligning body, the pressure line also has to be rotated at the same time. Said pressure line, however, is frequently very rigid. As a result the achievable angle of rotation is limited.

Consequently, it is the object of the invention to create an apparatus for the rehabilitation of pipelines using a fluid line system, rotation of the apparatus about its longitudinal axis or reciprocal rotation of components of the apparatus being possible.

In the case of an apparatus for the rehabilitation of pipelines using a fluid line system with at least one fluid line for supplying and/or removing a fluid medium, to achieve the object it is proposed that the fluid line system is provided with at least one pivot joint.

The apparatus according to the invention for the rehabilitation of pipelines can also be referred to in the present case as a rehabilitation apparatus or a packer.

Using the solution according to the invention, it is possible to rotate the apparatus about its longitudinal axis and to rotate components of the apparatus in a reciprocal manner in relation to each other without the fluid line system, and in particular the fluid lines thereof, being rotated or twisted. The fluid line system preferably comprises, as the fluid line, a pipeline and/or a hose for supplying and/or removing the fluid medium. Water vapor is preferably used as the fluid medium, which can also be referred to as fluid or fluid medium. Consequently, in a preferred manner, the fluid pressure is water vapor pressure. Generally speaking, a gaseous or liquid medium can also preferably be provided. The fluid line system preferably serves for the purpose of providing the necessary fluid pressure and/or the fluid medium in order to invert a calibration hose and/or to press on and harden off a lining element.

The movements and/or the torsional stresses of the fluid pipeline(s) can be equalized by way of the pivot joint. In addition, the apparatus or components of the apparatus can be rotated further in such a manner that even a lateral pipeline which branches off downward or inclinedly downward from the main pipeline is able to be rehabilitated. The rehabilitation apparatus is consequently rotatable into every desired position, the rotatability not being limited by the fluid line system and the fluid line(s) not being stressed by torsion.

In the case of the rehabilitation apparatus explained beforehand, alignment of the aligning body is consequently possible by means of rotation about the longitudinal axis of the rehabilitation apparatus within a large rotational angle range. In addition, it is no longer necessary, when inserting the apparatus into the pipe, to align the apparatus already in a precise way in the front area in such a manner that the aligning body points in the direction of the lateral pipe which protrudes from the main pipe. Consequently, it is now possible to align the apparatus in a corresponding manner on site, that is to say in the region of the mouth to be rehabilitated. This is preferably effected with the help of a camera attached to the apparatus.

Preferred further developments are named in Claims 2 to 12.

In one advantageous further development, at least one fluid chamber, preferably a fluid channel, is configured in the pivot joint. The fluid channel is preferably configured as a circumferential ring channel.

In the case of a further preferred embodiment, the pivot joint subdivides the at least one fluid line into a first fluid line section and a second fluid line section. This ensures that when the apparatus or components of the apparatus are rotated, a constant supply or removal of a fluid pressure is ensured by means of the pivot joint. In an advantageous manner, in this connection, one of the fluid line sections can rotate at least in sections and the other fluid line section can not rotate. However, both fluid line sections can also rotate. As an alternative to this, the pivot joint can also be attached on one end of the fluid line(s) such that the fluid line system or the fluid line(s) is not subdivided into two sections.

In a further preferred development, the pivot joint has at least one fluid inlet opening which connects the first fluid line section to the fluid chamber and at least one fluid outlet opening which connects the second fluid line section to the fluid chamber. This means that a connection between the two fluid line sections is made possible by means of the fluid chamber.

In an advantageous manner, the pivot joint is formed from a first disk-shaped element and a second disk-shaped element. In general, the pivot joint can be formed from at least two pivot joint elements. Each of said elements preferably has a fluid chamber section for forming the fluid chamber. In addition, one of said elements preferably has a fluid inlet opening and the other element a fluid outlet opening. These types of openings have already been explained further above.

In a further advantageous manner, at least one bearing which connects the two elements to each other so as to be rotatable is provided between the two elements. This means that the two elements can be rotated in relation to each other. The bearing is preferably a pivot bearing or a rolling bearing. In a preferred manner, it is a needle bearing. A bearing of this type distinguishes itself by its low installation height such that the pivot joint also has a low installation height. This is advantageous in particular on account of the predominant narrow space available inside the pipelines. In addition, a bearing of this type has a small amount of friction and a small amount of wear and is cost-efficient to produce.

In a further advantageous development, the first element has a circumferential indentation and a circumferential shoulder and the second element has a first circumferential projection and a second circumferential projection, wherein, in the assembled state of the pivot joint, the first projection engages over the shoulder and the second projection engages in the indentation. This means that the two elements are able to interlock and at the same time said two elements have a rotatable bearing arrangement whilst forming a fluid chamber.

In a further advantageous manner, at least one seal is provided between the two elements for sealing the fluid chamber. As a result of the seal provided between the two elements, sufficient sealing of the fluid chamber and/or of the bearing is ensured. This means that a constant fluid pressure can be maintained in the fluid chamber. In addition, ingress of dirt is prevented.

In an advantageous manner, the pivot joint is coupled to a motor which enables a rotational movement of the pivot joint. The term "coupling" refers to the fact that the pivot joint is either connected to the motor in a direct manner or in an indirect manner by means of a carrying element which is described further below and is connected to the motor. In a preferred manner, the motor is operated in a pneumatic, electric and/or magnetic manner. The motor can preferably be arranged and set up in such a manner that rotation of the apparatus about its longitudinal axis and/or rotation of components of the apparatus in relation to each other is made possible.

Furthermore, the apparatus is characterized in an advantageous manner by a carrying device, on which function units of the apparatus can be fastened, wherein the carrying device has at least two carrying elements, wherein at least one carrying element is coupled, in particular connected to the pivot joint. In this connection, it can also be provided as an alternative to this or in addition to this that at least one carrying element is connected to the pivot joint.

The carrying device forms a solid base and preferably extends substantially along a longitudinal direction which corresponds substantially to the longitudinal axis of the pipeline. Rod elements are preferably provided as carrying elements. These types of rod elements have an elongated form which is very suitable with regard to the space available in a pipeline. As an alternative to this or in addition to it, other elements can also be provided for the carrying device, for example plates, struts, frames or similar. The term "function unit" within the framework of the present invention refers, in particular, to those devices, units or apparatuses which are provided for carrying out the rehabilitation method for the rehabilitation apparatus.

In the case of an advantageous further development, a rotatable aligning body which is movable into a mouth region of a pipeline for positioning a calibration hose is coupled to the carrying element which is coupled to the pivot joint. The aligning body is preferably arranged inside the calibration hose and, once the alignment body is aligned, can press the calibration hose against the inside wall of the pipe by rotation about the longitudinal axis of the apparatus. The aligning body is preferably movable in a substantially perpendicular manner with respect to the longitudinal axis.

In one advantageous development, the carrying elements are rotatable in relation to each other by means of the pivot joint. Rotation of the apparatus about its longitudinal axis and/or rotation of components of the apparatus, in particular the carrying elements, in relation to each other can be made possible in this way.

The apparatus according to the invention for the rehabilitation of pipelines is explained below in more detail by way of the following drawings, in which, in a schematic manner:

Figure 1:
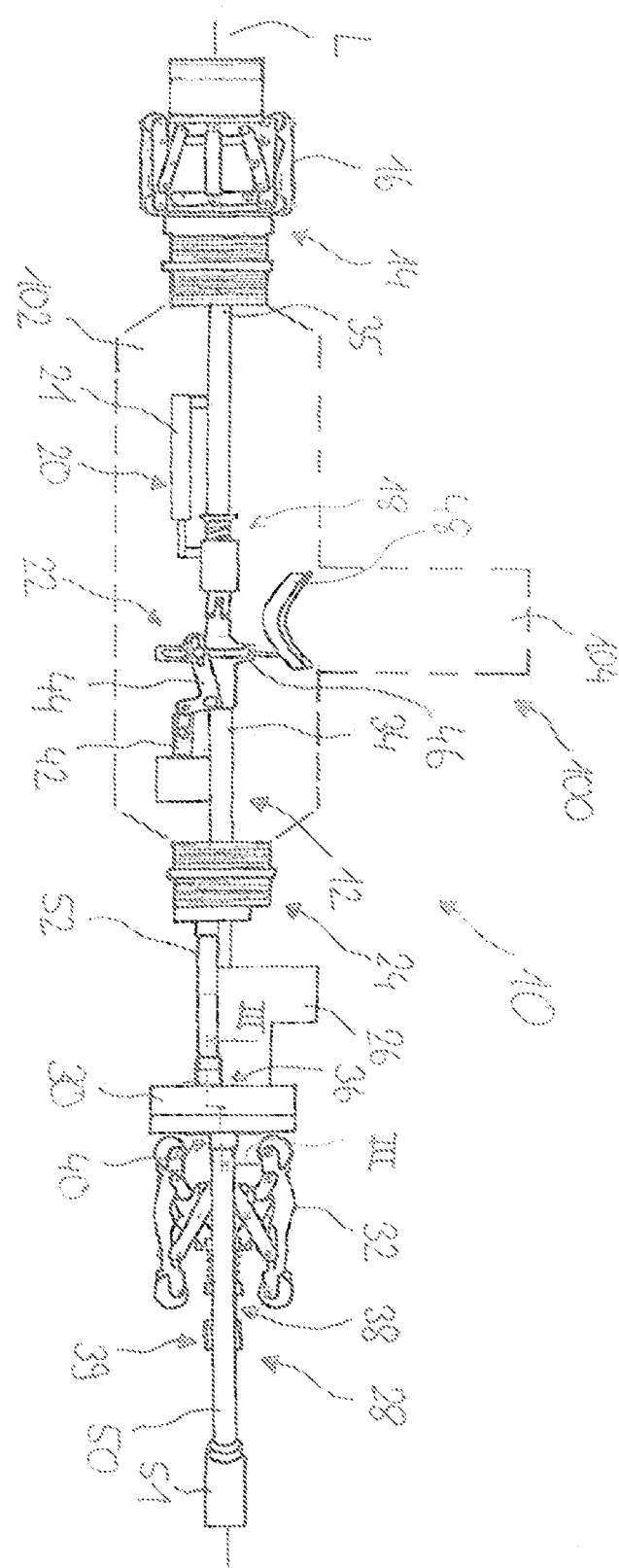
FIG. 1 shows a schematic side view of the apparatus according to the invention for the rehabilitation of pipelines using a fluid line system.

FIG. 1 shows a schematic representation of an apparatus 10 according to the invention for the rehabilitation of pipelines, the apparatus 10 being surrounded in part by a calibration hose 100, which is shown by the broken line.

The rehabilitation apparatus 10 comprises a carrying device 12, on which the essential function units of the rehabilitation apparatus 10 are fastened. As essential function units, the apparatus 10 comprises a first connection device 14, a first traveling unit 16, a buckling mechanism 18, an actuating apparatus 20, a lifting mechanism 22, a second connection device 24, a rotary drive 26, a fluid line system 28, a pivot joint 30 and a second traveling unit 32.

The carrying device 12 has a first carrying element 34 with a first end 35 and a second end 36 and a second carrying element 38 with a first end 39 and a second end 40. The first end 35 of the first carrying element 34 is connected to the first connection device 14, the first connection device 14 being coupled to the first traveling unit 16. In addition, the buckling mechanism 18, by way of which the first carrying element 34 can be moved into a buckling position, is arranged on the first carrying element 34. In addition, the buckling mechanism 18 can be moved into a buckle release position and a buckle inhibit position by way of the actuating apparatus 20, which comprises a drive device 21. The drive device 21 is preferably a linear drive with a pneumatic cylinder as the displaceable cylinder. The lift mechanism 22, which has a pneumatic cylinder 42, a toggle lever 44, a carrying framework 46 and an aligning body 48, is provided next to the buckling mechanism 18. The second connection device 24 is arranged next to the lift mechanism 22, the first carrying element 34 extending through a passage which is not shown and is provided in the second connection device 24.

In addition, the first carrying element 34 is fixedly connected at its second end 36 to the pivot joint 30. A rotary drive 26 as the motor is arranged between the second connection device 24 and the pivot joint 30, said rotary drive being connected either to the pivot joint 30 and/or to the first carrying element 34. In addition, the second carrying element 38 is connected to the pivot joint 30 by way of its first end 40. The second traveling unit 32 is arranged on the second carrying element 38.

Figure 2:
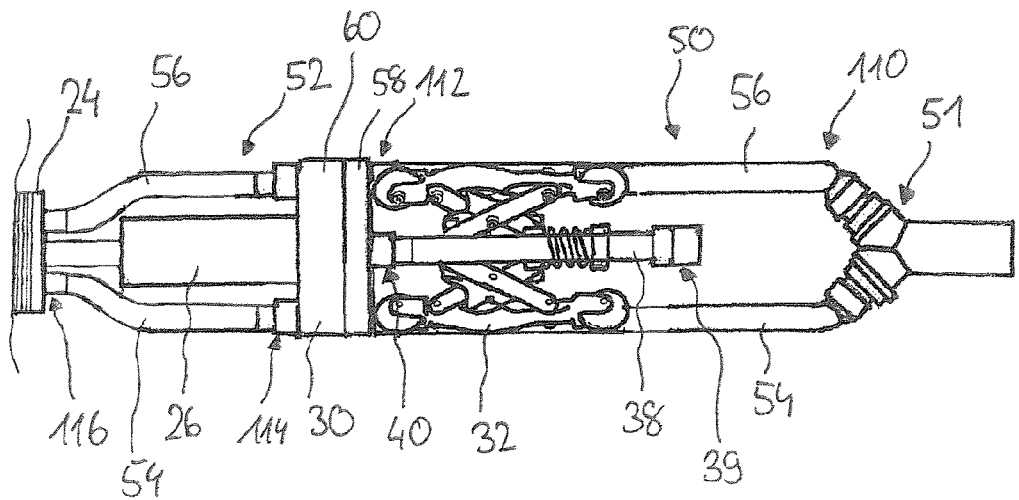
FIG. 2 shows a view from above onto the fluid line system according to FIG. 1.

The fluid line system 28 comprises a first fluid line section 50 and a second fluid line section 52, each of the fluid line sections 50, 52 having in each case a first line 54 and a second line 56, as can be seen in particular from FIG. 2. The first fluid line section 50 has a first end 110 and a second end 112, the first end 110 being connected to a connection piece 51 and the second end being connected to the pivot joint 30. The second fluid line section 52 also has a first end 114 and a second end 116. The first end 114 is connected to the pivot joint 30 and the second end 116 is connected to the connection device 24. In addition, openings (not shown) are provided in the second connection device 24 so that a fluid moved through the connection piece 51 can be introduced for the inversion of the calibration hose 100. The two fluid line sections 50, 52 or respectively the lines 54, 56 are also connected to each other by means of the pivot joint 30, as is explained below.

Figure 3:
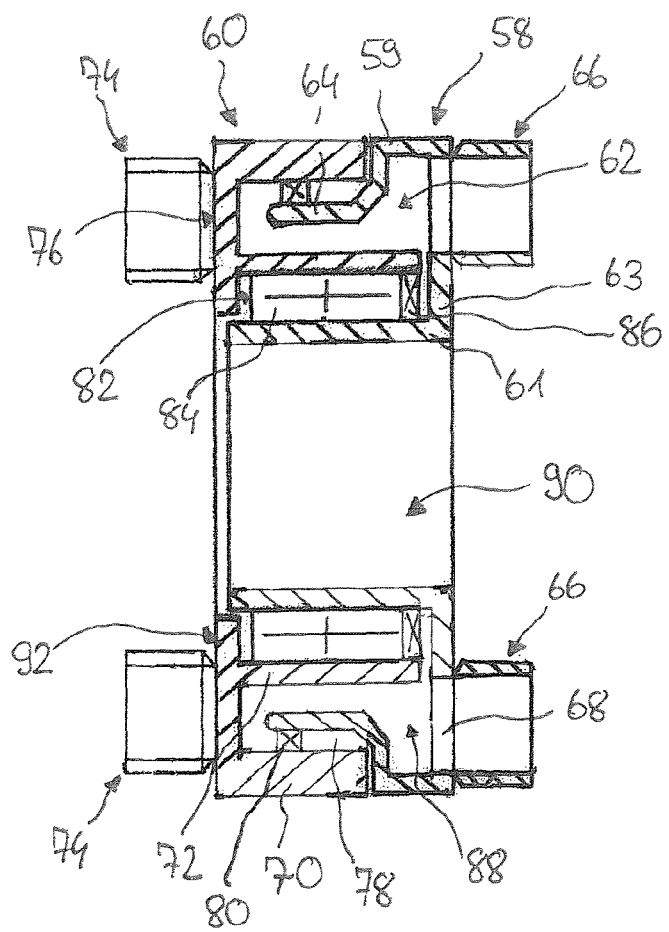
FIG. 3 shows a horizontal section along the line III-III in FIG. 1 through a pivot joint of the fluid line system according to FIGS. 1 and 2.

As can be seen in particular in FIG. 3, the pivot joint 30 has a first approximately disk-shaped element 58 and a second approximately disk-shaped element 60.

The first element 58 has a first portion 59, a second portion 61 and a base 63, which connects the two portions 59, 61 together, which (together) form a circumferential indentation 62. In addition, the first portion 59 has a circumferential shoulder 64. Furthermore, the first element 58 has two connections 66, in each case to a fluid inlet opening 68. As can be seen in particular in FIG. 2, the two lines 54, 56 of the first fluid line section 50 are connected to the connections 66.

The second element 60 has a first circumferential projection 70 and a second circumferential projection 72. In addition, two connections 74, which are connected in each case to a fluid outlet opening 76, are arranged on the second element 60. The lines 54, 56 of the second fluid line section 52 are connected to the connections 74.

As can be seen in FIG. 3, the first projection 70 engages over the shoulder 64 and the second projection 72 engages in the indentation 62. Between the shoulder 64 and the first projection 70 there is a first space 78 in which a first seal 80 is provided. In addition, between the second projection 72 and the second portion 61 there is a second space 82 in which a bearing 84 and a second seal 86, which adjoins the bearing 84, are arranged. The bearing 84 is a rolling bearing, any form and model of rolling bearings being conceivable. In particular, in the present exemplary embodiment, it is a needle bearing. The bearing 84 connects the first element 56 to the second element 60, the two elements 56, 60 being rotatable in relation to each other. O-ring seals can be used, for example, as seals 80, 86, any form of seal being conceivable.

A fluid chamber 88 is configured between the two elements 58, 60, in particular between the second projection 72 and the first portion 59. The fluid chamber 88 is a circumferential channel which connects the fluid inlet opening 68 to the fluid outlet opening 76. The seals 80, 88 serve, in particular, to seal the fluid chamber 88 in order to prevent fluid escaping and dirt ingressing.

In the case of a possible variant of the pivot joint 30, the first element 58 has a through-opening 90, through which the second end 116 of the second carrying element 38 can extend and can be fixed by means of an interference fit. In addition, the first carrying element 34 can be fastened on an outer surface 92 of the second element 60. The carrying elements 34, 38, however, can also be arranged and/or fastened in a different manner with respect to each other and with reference to the pivot joint 30.

One application of the fluid line system 28 with the pivot joint 30 is described below within the framework of the inversion of the calibration hose 100.

First of all, the calibration hose 100 is fastened on the apparatus 10. The calibration hose 100 comprises a main pipe calibration hose 102 and a lateral pipe calibration hose 104. To fasten the calibration hose 100 on the apparatus 10, the main pipe calibration hose 102 is fastened at each end by means of tensioning sleeves (not shown) on the connection devices 14, 24 in such a manner that a fluid-tight connection is created. Consequently, the calibration hose 100 and the connection devices 14, 24 can provide a volume which can be acted upon with fluid pressure. The calibration hose 100 then forms an inflatable sleeve.

As an alternative to this, the first connection device 14 can be provided with a passage (not shown) and an inversion hose or support hose (not shown) can be connected in a fluid-tight manner to the first connection device 14, the other end of the inversion hose being substantially fluid-tight. Such an inversion hose is necessary when the lateral pipe section to be rehabilitated and consequently the associated lateral pipe calibration hose with the lining element are very long such that the lateral pipe calibration hose and the lining element, in the not yet inverted state, do not have enough space inside the main pipe calibration hose. By means of the passage provided in the first connection device 14, the lateral pipe calibration hose with the lining element, held up in the inversion hose, can be inserted into the interior of the calibration hose 100.

In addition, a lining element (not shown) which is saturated with resin and has a main pipe section and a lateral pipe section, is arranged along the calibration hose 100. The main pipe section surrounds the main pipe calibration hose 102 and the lateral pipe section is arranged in such a manner in the region of the lateral pipe calibration hose 104 that the lateral pipe calibration hose 104 in the inflated state is able to extend through the lateral pipe section. The calibration hose 100 can be inflated to check its tightness. Afterwards, the air is let out of the calibration hose 100 and the lateral pipe calibration hose 104 is pulled by means of a cable (not shown) into the interior of the main pipe calibration hose 102 and possibly into the above-mentioned inversion hose.

The apparatus is then moved by means of the traveling units 16, 32 into the region of the mouth to be rehabilitated. Both traveling units 16, 32 are adjustable in order to be able to be adapted to different pipe diameters. Depending on the angle at which the lateral pipe/house connection pipe protrudes from the main pipe, the aligning body 48 has to be aligned in such a manner that it can latch in the mouth of the house connection pipe. The rotary drive 26 is actuated for this purpose such that the second element 60 rotates in relation to the first element 58. By the first carrying element 34 being fixedly connected to the second element 60, the first carrying element 34 is rotated about the longitudinal axis L in such a manner until the aligning body 58 in the region of the house connection pipe is able to be inserted into the mouth region by means of the lift mechanism 22. In order to be able to perform a visual check, a camera (not shown) is attached on the rotary drive 26.

The latching of the aligning body 48 in the mouth region is described in more detail below. We refer in this connection to European Patent 1 519 100 B1 and hereby make the technical teaching explained therein in this connection the subject matter of the present disclosure. As already mentioned, the pneumatic cylinder 42 has a toggle lever 44 on both sides of the first carrying element 34. A carrying framework 46, which carries the preferably ring-shaped aligning body 48, is fastened on the free ends of the toggle lever 44. As a result, the aligning body 48 is movable in a substantially perpendicular manner with respect to the longitudinal axis L. If the pneumatic cylinder 42 is acted upon with pressure, the aligning body 48 is moved upward by means of the lift mechanism 22 until the aligning body 48 is situated in the mouth region of the house connection pipe. In addition, there is provided a spring means which presses the aligning body 48 in a resiliently springy manner in the direction of the mouth of the house connection pipe and makes possible rotation of the aligning body 48 until said aligning body latches in the mouth of the house connection pipe. If the aligning body 48 is not situated precisely with respect to the mouth of the house connection pipe and abuts against an edge of the main pipe, after rotation of the apparatus and/or rotation by means of the pivot joint 30 and the rotary drive 26, the aligning body 48 can slip into or be pressed into the mouth of the house connection pipe as a result of the springable pressing force.

Once the aligning body 48 is latched in the mouth region, the calibration hose 100 is acted upon with pressure by means of the fluid line system 28. To this end, vapor, preferably at 120° C. and at a pressure of 2 bar, is introduced by means of the fluid line system 28. As a result of the pressurization, the main pipe calibration hose 102 presses the main pipe section of the lining element against the main pipe and the lateral pipe calibration hose 104 is inverted into the house connection pipe and presses the lateral pipe section of the lining element against the inside wall of the house connection pipe. Once the lining element has hardened off, the vapor is let out of the calibration hose 100. This can be effected by means of an outlet valve and/or the fluid line system. The lateral pipe calibration hose 104 is inverted again by means of a cable and the apparatus 10 is then moved out of the main pipe.

The apparatus 10 according to the invention is distinguished in that, to position the aligning body 48 by rotating the carrying element 34 about the longitudinal axis L by means of the pivot joint 30, an arbitrary angle of rotation is possible, the lines 54, 56 not impeding said rotation and not being twisted or only being twisted a little. The reason for this is that the pivot joint 30 subdivides the fluid line system 28 into a first fluid line section 50 and a second fluid line section 52, the second fluid line section 52 being rotatable in relation to the first fluid line section 50.

| List of references | |
|---|---|
| 10 | Apparatus |
| 12 | Carrying device |
| 14 | First connection device |
| 16 | First traveling unit |
| 18 | Buckling mechanism |
| 20 | Actuating apparatus |
| 21 | Drive apparatus |
| 22 | Lift mechanism |
| 24 | Second connection device |
| 26 | Rotary drive |
| 28 | Fluid line system |
| 30 | Pivot joint |
| 32 | Second traveling unit |
| 34 | First carrying element |
| 35 | First end |
| 36 | Second end |
| 38 | Second carrying element |
| 39 | First end |
| 40 | Second end |
| 42 | Pneumatic cylinder |
| 44 | Toggle lever |
| 46 | Carrying framework |
| 48 | Aligning body |
| 50 | First fluid line section |
| 51 | Connection piece |
| 52 | Second fluid line section |
| 54 | First line |
| 56 | Second line |
| 58 | First element |
| 59 | First portion |
| 60 | Second element |
| 61 | Second portion |
| 62 | Indentation |
| 63 | Base |
| 64 | Shoulder |
| 66 | Connection |

-continued

List of references

| | |
|---|---|
| 68 | Fluid inlet opening |
| 70 | First projection |
| 72 | Second projection |
| 74 | Connection |
| 76 | Fluid outlet opening |
| 78 | First space |
| 80 | First seal |
| 82 | Second space |
| 84 | Bearing |
| 86 | Second seal |
| 88 | Fluid chamber |
| 90 | Through-opening |
| 92 | Outer surface |
| 100 | Calibration hose |
| 102 | Main pipe calibration hose |
| 104 | Lateral pipe calibration hose |
| 110 | First end |
| 112 | Second end |
| 114 | First end |
| 116 | Second end |
| L | Longitudinal direction |

The invention claimed is:

1. Apparatus for the rehabilitation of pipelines of the type wherein a lining element is selectively inverted under pressure into, and pressed against an inside wall of, a lateral pipeline to be repaired, the apparatus comprising a fluid line system with at least one fluid line for supplying and/or removing a fluid medium and/or a fluid pressure used to invert the lining element, wherein the fluid line system is provided with at least one pivot joint disposed between first and second carrying elements of the rehabilitation apparatus, and characterized in that the at least one pivot joint being coupled to a motor disposed on the first carrying element which enables a rotational movement of the at least one pivot joint.

2. The apparatus according to claim 1, characterized in that at least one fluid chamber is configured in the at least one pivot joint.

3. The apparatus according to claim 1, characterized in that the at least one pivot joint subdivides the at least one fluid line into a first fluid line section and a second fluid line section.

4. The apparatus according to claim 3, characterized in that the at least one pivot joint has at least one fluid inlet opening which connects the first fluid line section to a fluid chamber and at least one fluid outlet opening which connects the second fluid line section to the fluid chamber.

5. The apparatus according to claim 1, characterized in that the at least one pivot joint is formed from a first disk-shaped element and a second disk-shaped element.

6. The apparatus according to claim 5, characterized in that at least one bearing which connects the first and second disk-shaped elements to each other so as to be rotatable, is provided between the two elements.

7. The apparatus according to claim 5, characterized in that the first disk-shaped element has a circumferential indentation and a circumferential shoulder, in that the second disk-shaped element has a first circumferential projection and a second circumferential projection, wherein, in the assembled state of the at least one pivot joint, the first circumferential projection engages over the shoulder and the second circumferential projection engages in the indentation.

8. The apparatus according to claim 5, characterized in that at least one seal is provided between the first and second disk-shaped elements for sealing the fluid chamber.

9. The apparatus according to claim 1, wherein the first and second carrying elements are coupled to the at least one pivot joint.

10. The apparatus according to claim 9, characterized in that a rotatable aligning body which is movable into a mouth region of a pipe for positioning a calibration hose is coupled to one of the first and second carrying elements.

11. The apparatus according to claim 9, characterized in that the first and second carrying elements are rotatable in relation to each other by means of the at least one pivot joint.

12. Apparatus for the rehabilitation of pipelines comprising a fluid line system with at least one fluid line for supplying and/or removing a fluid medium, wherein the fluid line system is provided with at least one pivot joint, the at least one pivot joint formed from a first disk-shaped element and a second disk-shaped element, the first disk-shaped element having a circumferential indentation and a circumferential shoulder, and the second disk-shaped element having a first circumferential projection and a second circumferential projection, and wherein, in the assembled state of the at least one pivot joint, the first circumferential projection engages over the shoulder and the second circumferential projection engages in the indentation.

13. An apparatus for the rehabilitation of pipelines comprising a fluid line system with at least one fluid line for supplying and/or removing a fluid medium, the apparatus comprising at least one pivot joint in the fluid line system, the at least one pivot joint being formed from a first disk-shaped element and a second disk-shaped element, wherein the first disk-shaped element has a circumferential indentation and a circumferential shoulder, the second disk-shaped element has a first circumferential projection and a second circumferential projection, and wherein, in the assembled state of the pivot joint, the first circumferential projection engages over the shoulder and the second circumferential projection engages in the indentation.

* * * * *

UNITED STATES PATENT AND TRADEMARK OFFICE
CERTIFICATE OF CORRECTION

PATENT NO. : 9,476,537 B2  
APPLICATION NO. : 14/126965  
DATED : October 25, 2016  
INVENTOR(S) : Bichler Page 1 of 1

It is certified that error appears in the above-identified patent and that said Letters Patent is hereby corrected as shown below:

On the Title Page

Item (73), please delete "TRELLEBORG PIPE SEALS DUISBURGH GMBH (DE)" and insert --TRELLEBORG PIPE SEALS DUISBURG GMBH (DE)--.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*